Figure 1:
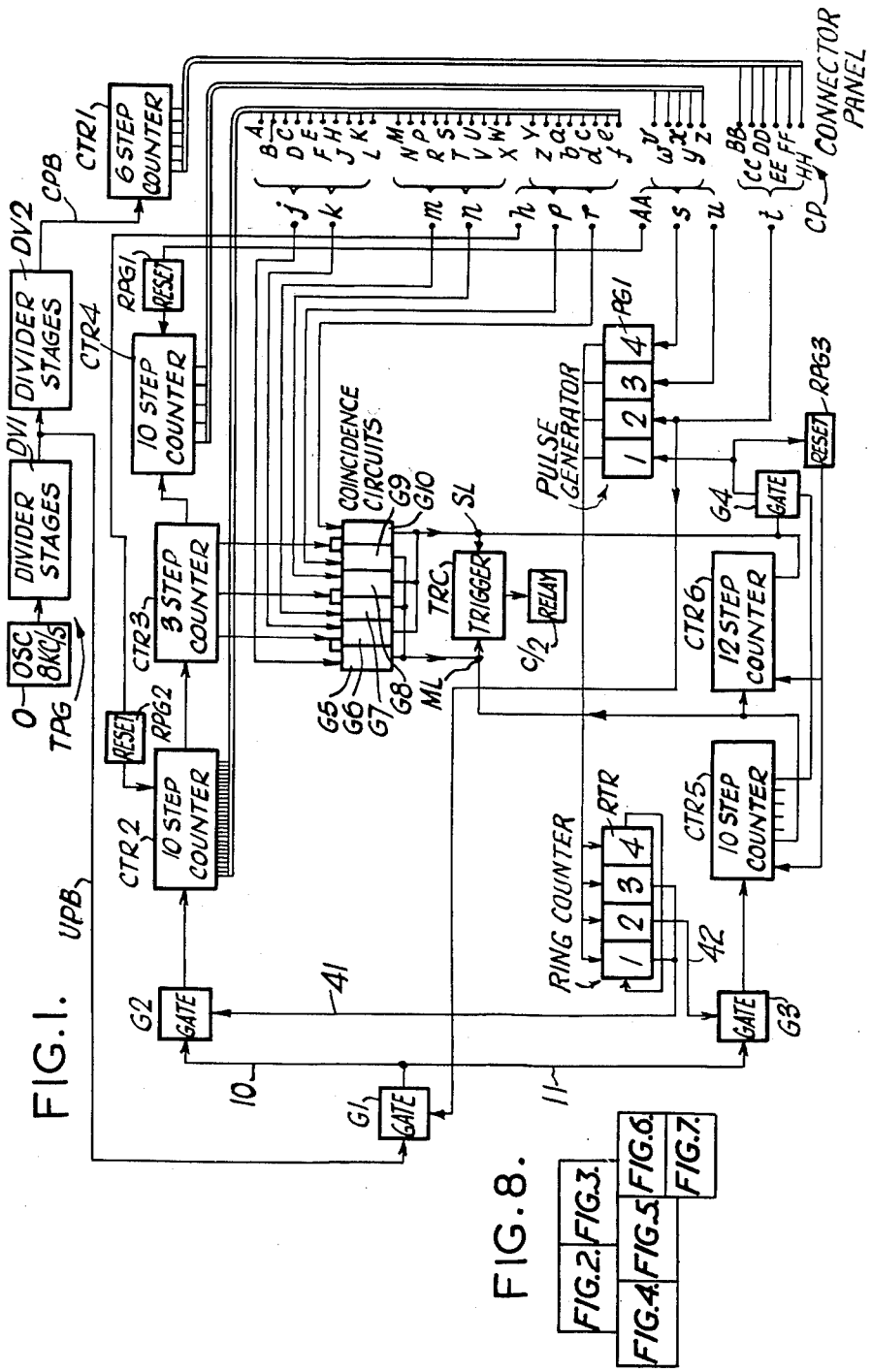

JOHN W. DeL. NICHOLS AND
ALEXANDER C. MacKELLAR
BY Cushman, Darby & Cushman
ATTORNEYS

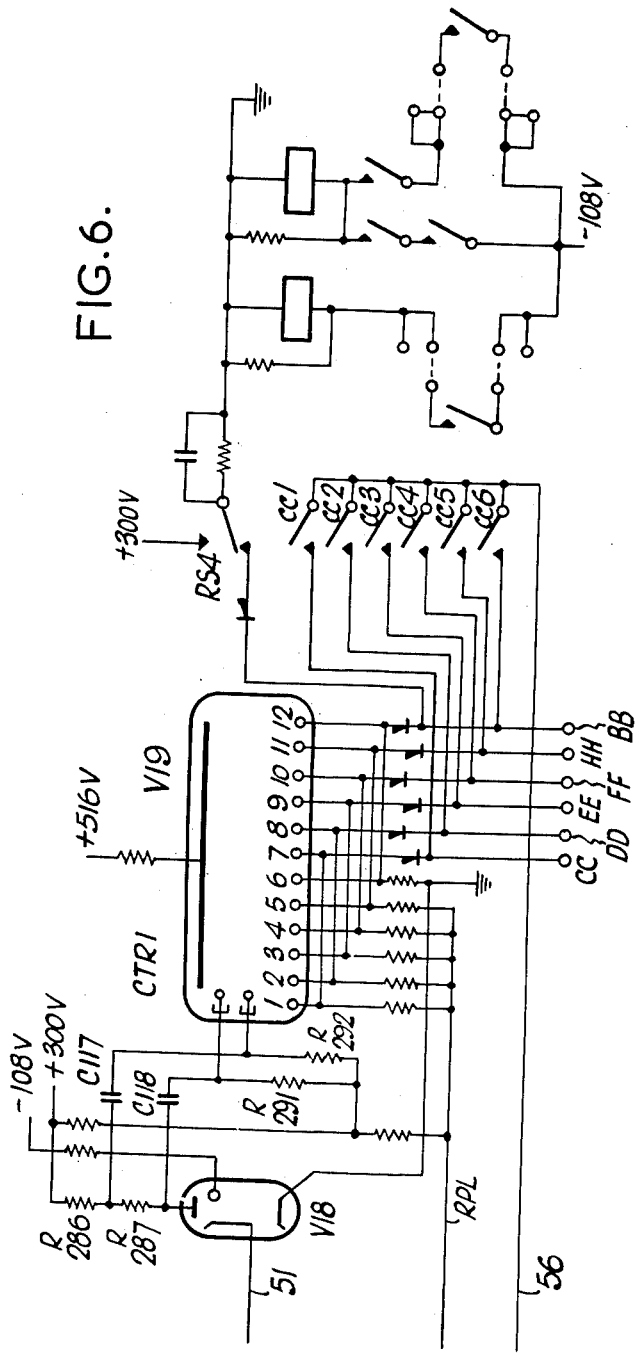

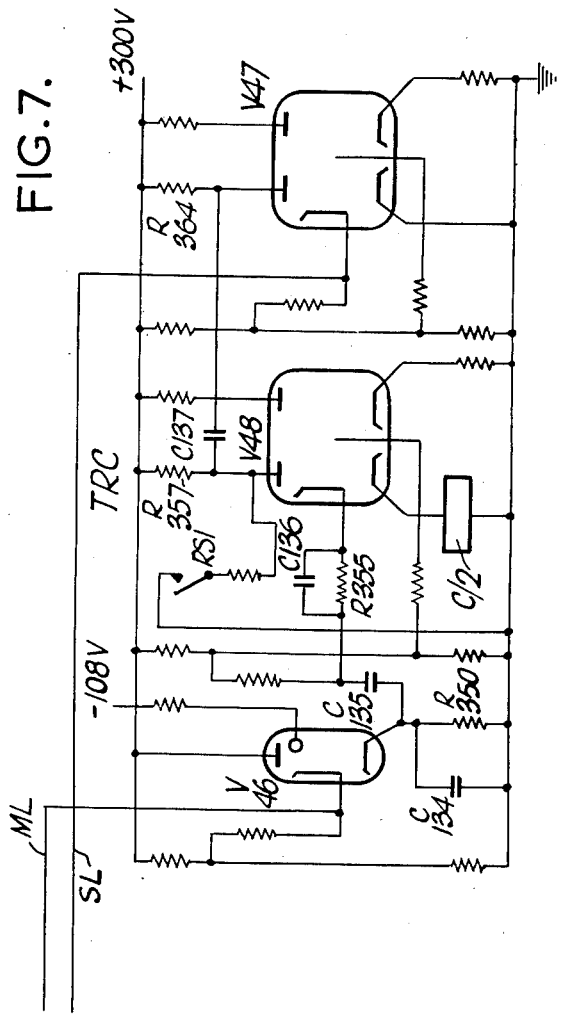

United States Patent Office 3,056,548
Patented Oct. 2, 1962

3,056,548
ELECTRONIC CONTROL APPARATUS
John Winfrith de Lisle Nichols, Godalming, and Alexander Campbell MacKellar, Lindfield, England, assignors to National Research Development Corporation, London, England, a British corporation
Filed July 14, 1959, Ser. No. 827,081
Claims priority, application Great Britain July 22, 1958
14 Claims. (Cl. 235—92)

This invention relates to electronic control apparatus more particularly adapted to provide the equivalent of a mechanically driven cam-controlled switching system for effecting a cyclic repetition of a predetermined sequence of events, which sequence may readily be altered or adjusted. One specific, although by no means exclusive, application of the invention is to the control of each of a group of coded radio beacons as may be provided at a number of spaced and known geographical locations for the purpose of aiding navigation of mobile craft such as ships or aircraft.

One feature of the present invention resides in the use of a plurality of multi-electrode gas-discharge tubes of the counter type, for instance, those known under the trade name "Dekatron," with the counting cycle of the first tube controlled by an input pulse train, e.g. on a timing basis, and with the counting cycle of the subsequent tube or tubes controlled by the output or outputs from one or more of the sequentially active electrodes of the preceding tube or tubes, the outputs available from selected ones of the sequentially active electrodes of the first tube being employed in combination with the outputs available from selected ones of the sequentially active electrodes of the subsequent tube or tubes through the intermediary of coincidence gate circuit devices to actuate operation-controlling means, such as one or more relays, which perform the required sequence of operation steps.

In accordance with one particular form, electronic control apparatus according to the invention comprises at least a first and a second multi-electrode gas-discharge tube of the counter type, a source of sequential input pulses, means for applying said input pulses to said first tube to cause such tube to execute a plurality of counting cycles in which each of its output electrodes is energised in turn, means for deriving an output stepping pulse from said first tube once during each counting cycle thereof and for applying such stepping pulse to said second tube to cause at least some of its output electrodes to be energised in turn during successive counting cycles of said first tube, a plurality of coincidence gate circuit devices, a plurality of circuit connections each including buffer isolating means for connecting a first controlling input of each of said gate circuit devices to a chosen one of the output electrodes of said first tube, a second plurality of circuit connections for connecting a second controlling input of each of said gate circuit devices to a chosen one of the output electrodes of said second tube and electrically operated control means connected for operation by the outputs from said gate circuit devices.

By the provision of means, such as a multi-way connection panel whose various terminals are preferably in the form of socket connectors for the reception of a complementary connector plug and are connected to the different counter tube electrodes and gate circuit inputs, any desired operative sequence may readily be obtained and the operation sequence changed whenever required merely by making the necessary cross connections, such as by inserting an appropriately wired connector plug.

In order that the nature of the invention may be more readily understood one particular embodiment, adapted fo rthe control of one of a number of similar radio beacons forming a co-ordinated group for navigational aiding purposes, will now be described with reference to the accompanying drawings in which:

FIGURE 1 is a block schematic diagram of the radio beacon.

FIGURES 2–7 form, in combination, a more detailed circuit diagram of certain parts of the arrangement of FIG. 1 while FIGURE 8 is a key diagram showing the manner in which FIGS. 2–7 should be assembled in order to form such composite circuit diagram.

The embodiment to be described is adapted to control a telegraphic type radio transmitter whereby such transmitter radiates, during one chosen minute period of each of a continuous series of six minute cycles, a predetermined number of repetitions of a station-identifying morse code signal followed by a constant amplitude signal period usable for bearing-obtaining purposes, the latter being followed by a further predetermined number of repetitions of the original station-identifying code signal.

The identifying morse code signal is built up from a number of 0.25 second time periods, each dot signal element being one of such 0.25 second duration time periods, each dash signal element being equal in duration to three dot elements, i.e. 0.75 second, each space between successive dot or dash signal elements of a letter or number character signal also being equal in duration to three dot elements and each space between successive character signals being equal in duration to five dot elements. The maximum permissible total length of each identifying signal is, in the present embodiment, equal to 30 dot elements but other lengths can obviously be provided for without difficulty.

Referring now to the block diagram of FIG. 1, the beacon arrangement comprises a master oscillator O consisting, for instance, of a temperature controlled crystal oscillator operating at 8 kc./s. The output of this oscillator is of pulse form and is applied to the input of a plurality of successive frequency divided stages DV1 whose output provides a unit time pulse signal consisting of a repetitive series of pulse signals at the rate of four pulses per second. This output is fed by way of lead UPB to certain parts of the arrangements with which the present invention is more particularly concerned and is also applied to the input of a further group of frequency divided stages DV2 which operate to provide an output on lead CPB consisting of a second series of repetitive pulses at the frequency of one pulse per minute. The divider stages DV1 and DV2 may be of any convenient known form but conveniently comprise a number of sequentially arranged gas-filled counter tubes. Such tubes will have associated therewith suitable pulse forming stages for generating trigger pulses from an output of each counter tube suitable for application as a triggering input to the next following counter tube.

The one pulse per minute output on lead CPB is applied to the input of a six-step counter circuit CTR1. This circuit comprises a multi-electrode counter tube and has six separate outputs, each of which is energised in turn in response to the successive input pulses, for a period time of one minute. Such six separate outputs are connected separately to six terminals BB, CC, DD, EE, FF and HH on a multi-way connector panel CP. Associated with this group of terminals on the panel CP is a terminal $t$ which is arranged to be capable of cross-connection, as by means of a jumper connector, to any one of the aforesaid six sequentially energised outputs of the counter circuit CTR1. The selected output at terminal $t$ is then applied as a control medium to a gate circuit G1 to which is also applied the unit time pulse signal, consisting of pulses at the rate of four pulses per second, available on lead UPB so that, for the period of one minute of each six minute period, such unit time pulses are available at the output of the gate circuit G1. The output from this gate G1 is applied over leads 10, 11 to the inputs of two further gate circuits G2 and G3 respectively.

The terminal *t* is also connected to the triggering input of one section, No. 2, of a four-section pulse generator PG1. The four separate outputs of this generator are connected in parallel and applied as a stepping input signal to the input of a four-stage ring counter circuit RTR. This ring counter circuit RTR normally rests with stage No. 4 thereof operative but, upon the arrival of the aforesaid minute pulse through terminal *t*, the resultant output from the pulse generator PG1 causes the ring counter RTR to step around whereby stage No. 1 is rendered operative. The output of this stage No. 1 is applied as a control medium to the gate circuit G2 so that when said stage No. 1 of counter RTR is operative, gate G2 is opened and allows the unit time pulses (at 4 c.p.s.) to be applied to the input of a ten-step counter circuit CTR2 employing a multi-electrode counter tube. Each arriving pulse causes this counter tube to move by one step around its ring of ten output electrodes.

A first group of ten output connections, taken respectively one from each of the ten sequentially active outputs of the counter CTR2, are connected respectively to separate terminals A, B, C, D, E, F, H, J, K and L of the connector panel CP. A second suitably isolated group of ten similar output connections, taken respectively one from each of the same ten outputs of the counter CTR2, are connected respectively to separate terminals M, N, P, R, S, T, U, V, W and X of the connector panel CP while a further group of similar isolated output connections, conveniently from only eight of the ten outputs, are connected respectively to further separate terminals Y, Z, *a, b, c, d, e* and *f* of the connector panel CP.

The completion of each ten-step cycle of the counter CTR2 is marked by the generation of an output pulse which is applied to trigger a further three-step counter CTR3 which again comprises a multi-electrode counter tube. This counter CTR3 has three outputs which are energised in turn, each for the period of one ten-step cycle of the counter CTR2. The first output, energised while counter CTR2 is making its first operative step cycle, is applied as one control input to a pair of coincidence gate circuits G5 and G6. A second control input for gate G5 is derived from terminal *j* of the connector panel CP while a second control input for gate G6 is derived from terminal *k* of the same panel. These terminals are arranged to be cross-connected, as required, to any one or more terminals of the terminal group A–L. The second output from the counter CTR3, energised while the counter CTR2 is making its second stepping cycle, is applied as one control input for each of a further pair of coincidence gate circuits G7 and G8 whose second control inputs are derived respectively from terminals *m* and *n* of the control panel CP. These terminals are likewise arranged to be cross-connected, as desired, to any one of the group of terminals M–X. The third output from the counter CTR3, energised while the counter CTR2 is making its third operative stepping cycle, is applied as a controlling input of two further coincidence gate circuits G9, G10 whose other control inputs are derived respectively from terminals *p* and *r* of the panel CP. These terminals may be cross-connected, as required, to one or more terminals of the terminal group Y–*f*.

The outputs of the gate circuits G5, G7 and G9 are connected in parallel to a conductor ML, referred to as the "mark rail" which is, in turn connected to the triggering input of a two stable state trigger circuit TRC. The outputs of gate circuits G6, G8 and G10 are similarly connected in parallel to a conductor SL, referred to as the "space rail" which is, in turn, connected to the resetting input of such trigger circuit TRC.

During the first stepping cycle of counter CTR2, when only the gate circuits G5 and G6 can be conditioned to open, it is possible, by appropriate cross-connection of one or more of the terminals of group A–L to terminal *j*, to supply through gate G5, the output voltage available at one or more of the ten outputs of the counter CTR2 as a triggering pulse over mark rail ML to the triggering input of the trigger circuit TRC. Correspondingly, during the same period, by appropriate cross-connection of one or more of the same group of terminals A–L to terminal *k*, the output voltage available at one or more of the ten outputs of the counter CTR2 may be supplied as a resetting pulse through gate circuit G6 and space rail SL to the resetting input of the trigger circuit TRC.

A relay C/2, which is arranged to control the modulation of the radio transmitter (not shown) of the beacon is arranged with its operating winding connected to the trigger circuit TRC in such a manner that whenever the trigger circuit TRC is triggered "on" by an input voltage to the mark rail ML, the relay C/2 is energised and whenever such trigger circuit TRC is reset "off" by an input voltage to the space rail SL, such relay C/2 is de-energised. Thus, by appropriate cross-connection between the group of terminals A–L and the two terminals *j* and *k*, any desired sequence of energisation and de-energisation of relay C/2 may be set up to form the dot, dash and space periods of a first part of the identification code signal. A similar sequence of events takes place during the second stepping cycle of counter CTR2 but with the gate circuits G7 and G8 alone conditioned to be operative by the second output from the counter CTR3 whereby the switching cycle of relay C/2 to form a second part of the signal is now governed by the cross-connection between terminals of the group M–X with the terminals *m* and *n*. The third stepping cycle of counter CTR2 provides a further series of switching operations by the relay C/2 to form the final part of the signal. These operations are dependent upon the cross-connections between terminals of group Y–*f* and terminals *p* and *r* through the now-operative gate circuits G9 and G10.

At the completion of each three-step counting cycle of counter CTR3, an output is provided from such counter and is applied to the triggering input of a further counter CTR4 which is conveniently one of ten-step capacity employing a multi-electrode counter tube although not all of the available stepping positions are employed. Outputs from the second, third, fourth, fifth and sixth stages of this counter CTR4 are taken respectively to a further group of terminals *v, w, x, y* and *z* of the connection panel CP. These terminals are arranged for cross-connection to further terminals *s* and *u* of such panel CP. Terminal *s* is connected to the input of another stage, No. 4, of the pulse generator PG1 which supplies stepping pulses to the ring counter RTR so that, when this terminal *s* is energised by the output from a particular cross-connected one of the outputs of the counter CTR4, a pulse output is provided from this stage No. 4 of the generator PG1 as a stepping pulse to the four-stage ring counter RTR which accordingly now moves to render stage No. 2 thereof energised. The particular cross-connection of terminal *s* to the terminal group *v–z* is determined by the number of repetitions required of the station identification signal as defined by the three successive cycles of the counter CTR2 and the accompanying single cycle of the counter CTR3. Thus, cross-connection between terminal *s* and terminal *v*, which is connected to the second output of counter CTR4, will result, in one repetition of the code signal group generated during each three cycles of counter CTR2. Cross-connection between terminal *s* and terminal *w*, which is connected to the third output of counter CTR4, will provide for two repetitions of the code signal, i.e. three successive transmissions of such signal.

Stage No. 2 of the ring counter RTR has its output connected to supply a control potential to gate G3 whereby the above described change of ring counter RTR to render stage No. 2 thereof energised provides a control output voltage over lead 42 to gate G3 which now opens as gate G2 closes owing to the simultaneous cutting-off of stage No. 1 of such ring counter RTR. This causes the application of the unit pulse output from gate G1 to a further ten-step counter CTR5. This counter, which again may comprise a multi-electrode counter tube, is arranged to provide a first step output once during each of its ten-step cycles and this output is applied as a triggering input to a further twelve-step counter CTR6. This same first step output is also supplied to the mark rail ML associated with the trigger circuit TRC. The eleventh step output of counter CTR6 is connected to the space rail SL associated with the trigger circuit TRC. The aforesaid first step output from counter CTR5 therefore causes the relay C/2 to be energised and this relay condition persists until, after ten compelte cycles of counter CTR5 with the resultant ten successive stepping operations of counter CTR6, the eleventh step output of such counter CTR6 becomes energised. This provides an output to the space rail SL of the trigger circuit TRC whereby relay C/2 becomes deenergized again. This second part of the signal provided by the radio transmitter controlled by the relay C/2 comprises an uninterrupted constant-amplitude signal of 25 seconds duration and is adapted for use for bearing-obtaining purposes.

Such eleventh step output from counter CTR6 is also used to condition a gate circuit G4 whereby a slightly later output signal obtained from a different output of the counter CTR5 provides an output from the gate which is fed to another stage, No. 1, of the pulse generator PG1 and also to a reset circuit RPG3. The latter is arranged to reset each of the counters CTR5 and CTR6 back to their normal quiescent condition while the output from stage No. 1 of the pulse generator PG1 provides a further stepping pulse for the ring counter RTR whereby stage No. 3 thereof becomes energised. The output from this stage is connected in parallel with that of stage No. 1 of the same ring counter and accordingly gate G2 is again opened as gate G3 becomes closed. Unit time pulses from gate G1 are accordingly again applied to the group of counters CTR2, CTR3 and CTR4 with their associated coincidence gate circuits G5–G10 so as to operate the trigger TRC and relay C/2 once again in accordance with the identification signal pattern set up by the cross-connections on the connection panel CP. Each further three-step cycle of the counter CTR3 progresses the count state of the counter CTR4 by one step and after a predetermined number of further transmissions of the identification signal, determined by the chosen cross-connection between the terminal group v–z and terminal u, the energisation of the chosen output of the counter CTR4 provides an output pulse which is fed through such terminal u to stage No. 3 of the pulse generator PG1 whereby the latter provides a further stepping pulse to the ring counter RTR. This renders stage No. 4 of such ring counter operative; this is the normal quiescent condition of the whole arrangement. As no output is now availble from either gate G2 or gate G3, no stepping operation can occur in any counter. This instant coincides approximately with or slightly precedes the end of the particular one-minute pulse provided at terminal t from the selected output of the counter CTR1 so that simultaneously therewith or shortly afterwards, gate G1 is also closed to await the arrival of the next one-minute time pulse from such counter CTR1. This will not occur until an interval period of five minutes has elapsed. When it does occur again the above described cycle is repeated.

Five other beacon stations equipped with similar apparatus and initially synchronised in the operation of their equivalents of the counter CTR1 operate in turn during each five minute interval period, each in turn by suitable selection of the operative output from the counter CTR1 thereof.

Means are provided for positively resetting the counter CTR2 at any chosen instant during the third of its three operation cycles so as to avoid the need to await the completion of the whole of such third ten-step cycle before commencing the next operation, when such further steps are not required for code signalling purposes. This is effected by the connection of terminal h of the connection panel CP to that one of the terminal group Y–f which identifies the end of a space period (equal to 5 dot elements) following the last space pulse required on rail SL. This causes a further reset pulse generator RPG2 to energised simultaneously. The output from this is applied to reset the counter CTR2 back to its normal zero count state. Similar means are also provided for resetting the counter CTR4 at the end of the complete operation cycle. This is effected by connection of terminal AA of the panel CP to the appropriate terminal of the group v–z whereby the reset generator RPG1 is likewise energised to reset the counter CTR4 back to its normal quiescent or zero count state.

Figure 5:
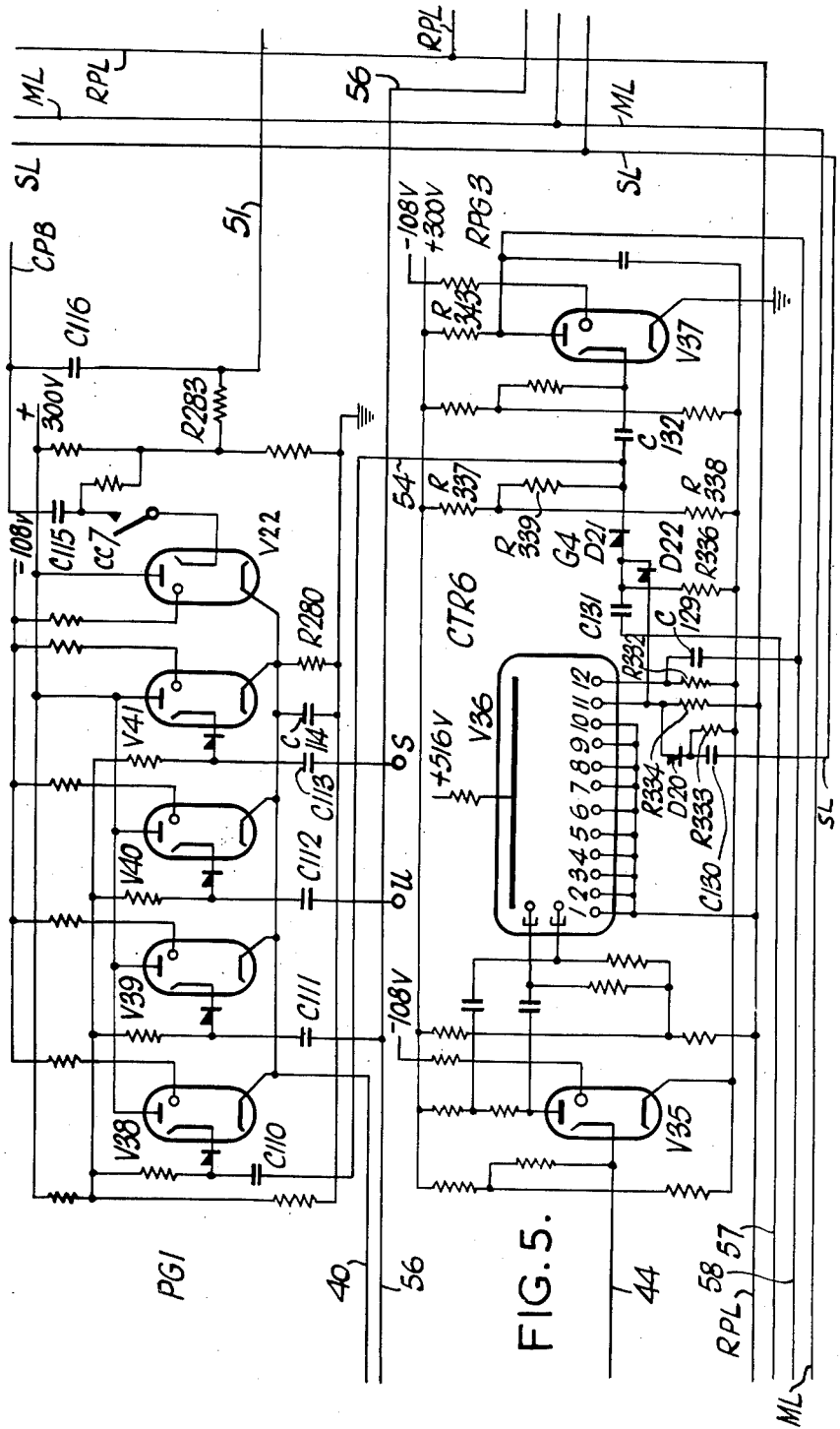

The counter CTR1 and its associated circuits is shown in some detail in FIG. 6, where the one pulse per minute output derived from the basic time pulse generator TPG through the divider stages DV1 and DV2, FIG. 1, is applied over lead CPB, FIG. 5, capacitor C116 and lead 51 to the trigger electrode of gas-filled trigger tube V18, FIG. 6, arranged as a self-quenching pulse forming stage and whose anode circuit comprises series resistors R286 and R287 and whose cathode is directly connected to earth.

Outputs are taken respectively from the anode of tube V18 and the junction between resistors R286 and R287 through capacitors C118 and C117 forming, with resistors R291 and R292, separate RC networks of different time constant values whereby the output potential available at the junction between capacitor C117 and resistor R292 reaches its maximum before that available at the junction between capacitor C118 and resistor R291. These phase-displaced outputs are connected respectively to the first and second guide electrodes of a twelve cathode counter tube V19.

In the circuit of this counter tube V19, the cathodes are connected in pairs, cathode 1 with cathode 6, cathode 2 with cathode 7 and cathode 3 with cathode 8 and so on. Each pair of cathodes, except that of cathodes 6 and 12, is connected to a reset pulse line RPL through a suitable load resistor, the cathodes 6 and 12 being connected through a load resistor direct to earth. A separate output is taken from each pair of interconnected cathodes through a blocking rectifier to the related terminal of the group BB—HH of the connection panel CP.

In the operation of this circuit, each positive-going one-minute pulse applied over lead 51 to the tube V18 causes this tube to strike and thereby to provide two time-displaced negative-going pulses to the guide electrodes of the counter tube V19. Each input one-minute pulse thus causes the discharge in this counter tube to step from one cathode to the next, visiting all cathodes in turn. In consequence of the interconnection of the tube cathodes in pairs, each of the output terminals CC—BB will present in turn a positive pulse lasting for one minute in each six minute sequence period.

Figure 3:
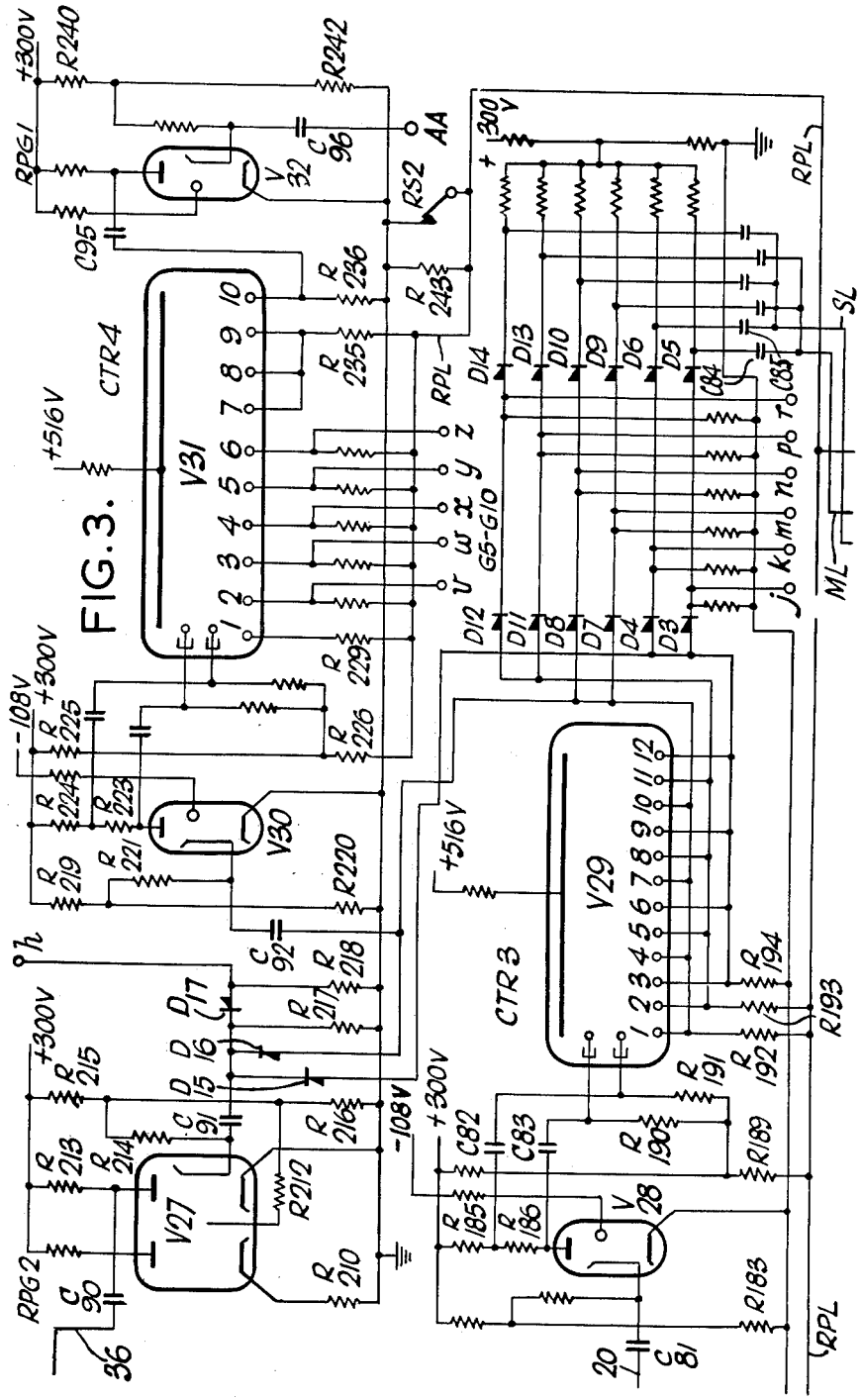

The lead RPL is normally at earth potential, being connected directly thereto by switch RS2, FIG. 3. When such switch is opened, however, the resistor R243 is placed in series with the lead RPL which feeds all counter tubes. As a result, the directly earthed cathode pair of tube V19 remains at earth potential and the potential of all the remaining cathodes rises thereby forcing the discharge to lie between the anode and one of the cathodes 6 or 12 and so provide a given datum or start position in this tube.

Figure 4:
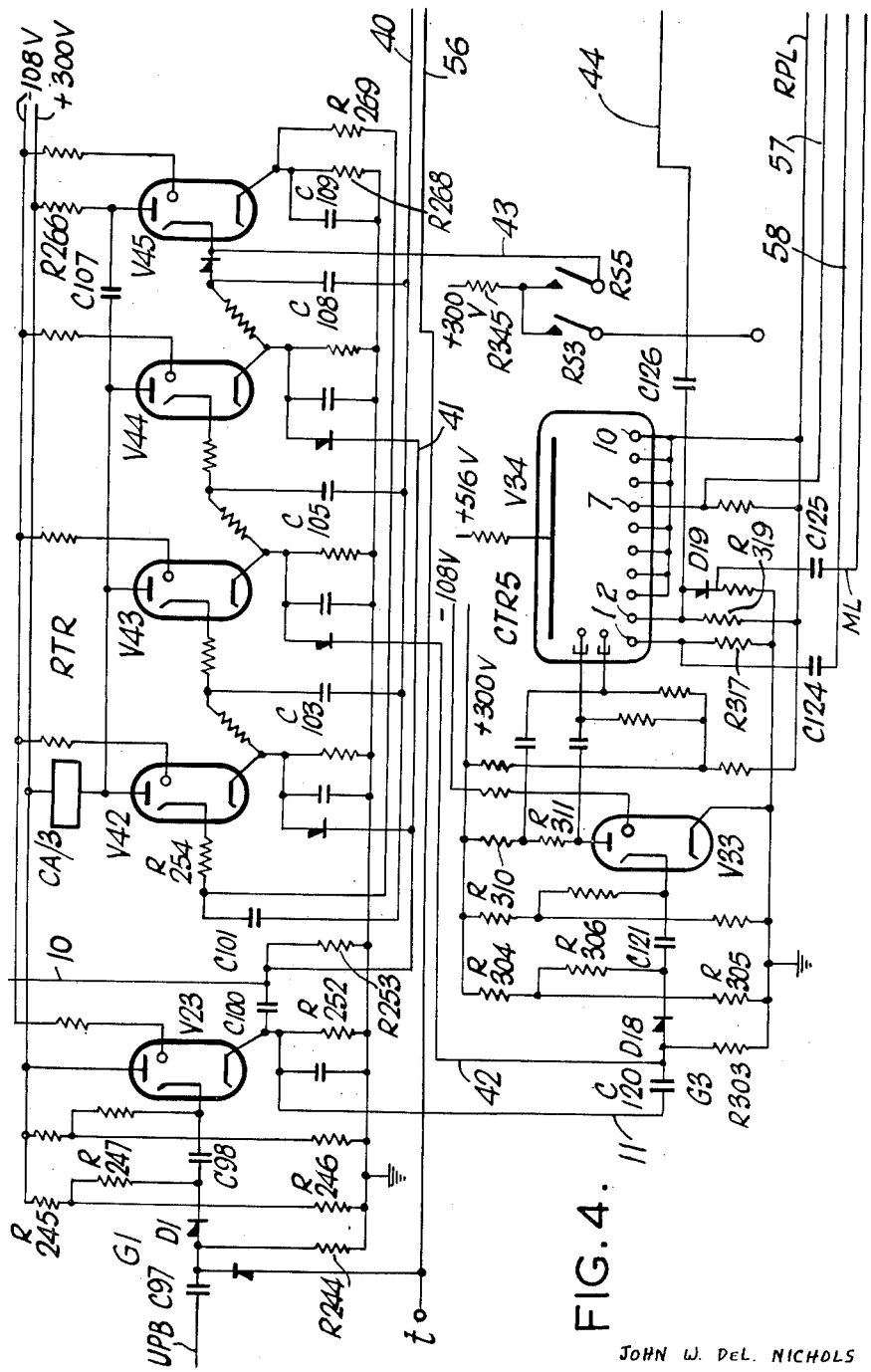

The gate circuit G1 and its associated circuits is shown in FIG. 4 where the four pulse per second output derived from the basic time pulse generator TPG through divider stages DV1, FIG. 1, is applied over lead UPB and by way of capacitor C97 to rectifier D1. This rectifier is coupled through capacitor C98 to the trigger electrode of a gas-filled trigger tube V23 having a cathode load resistor R252. The junction of rectifier D1 and capacitor C97 is connected through resistor R244 to earth whereas the junction of the rectifier and capacitor C98 is connected through resistor R247 to a point on a potentiometer network of resistors R245 and R246 which is sufficiently positive to block the rectifier D1 from passing any positive-going input pulses on the lead UPB to the trigger electrode of tube V23. Terminal $t$ of the connector panel CP is connected through a further rectifier to the junction between capacitor C97 and rectifier D1 so that when a positive pulse, of some 40 volts amplitude, from counter CTR1 is present at terminal $t$, rectifier D1 is unblocked and allows the four pulse per second input on lead UPB to become effective on the trigger electrode of the tube V23. The tube is arranged in a self-quenching circuit so that each pulse causes the tube to fire and corresponding positive-going pulses are made available at the tube cathode.

The four-stage ring counter RTR is also shown in FIG. 4 and comprises four gas-filled trigger tubes V42, V43, V44 and V45. In the quiescent state of the device, tube V45 is struck and is conductive and the remaining tubes are extinguished. The tubes are rendered conductive in turn in the order V42, V43, V44 and so back to V45 by positive-going pulses applied over common lead 40 and through individual capacitors C101, C103, C105 and C108 to the respective trigger electrodes of the tubes. The anodes of tubes V42, V43 and V44 are connected in parallel and through operating winding of relay CA/3 to the +300 v. supply whereby such relay is operated when any one of the three tubes concerned is conductive. The anode of tube V45 has its own anode load resistor R266 while the anode of such tube is coupled by capacitor C107 to the parallel-connected anodes of the other three tubes.

Each tube has its own cathode load network, such as that of resistor R268 and parallel capacitor C109 of tube V45, while each cathode is also coupled through resistors to the trigger electrode of the next following tube of the ring, see, for example, resistors R269 and R254 between the cathode of tube V45 and the trigger electrode of tube V42. In addition, the cathodes of tubes V42 and V44 are each connected through isolating rectifiers to lead 41 whereby, when either tube V42 or V44 is conductive, a positive potential is applied to the junction between capacitor C100 and resistor R253, which junction point is otherwise held at earth potential.

The cathode of tube V43 is similarly connected through an isolating rectifier to lead 42 whereby, when the tube V43 is conductive, a positive potential is applied to the junction between capacitor C120 and resistor R303, which junction point is otherwise held at earth potential.

It will be seen that the normal ring connection between the cathode of tube V44 and the trigger electrode of tube V45 includes a rectifier and that a further lead 43 is connected between the tube trigger electrode and one contact of a reset switch RS5 whose other contact is connected to the +300 v. supply through resistor R345. By closure of such switch RS5 the ring counter on tubes V42 . . . V45 can be forced at any time to the normal quiescent state in which tube V45 alone is conductive.

The circuit arrangement of the four-section pulse generator PG1 is shown in FIG. 5 and comprises four gas-filled trigger tubes V38, V39, V40 and V41 having their cathodes joined in parallel and connected to earth through a common cathode load network of resistor R280 shunted by capacitor C114. The tube anodes are similarly interconnected in parallel and supplied direct from the +300 v. supply. Each tube is arranged as a self-quenching pulse forming stage and when any one tube is struck a positive-going output pulse is delivered to the lead 40 which forms the stepping pulse input of the four-stage ring counter RTR of tubes V42, V43, V44, V45, FIG. 4.

The triggering input for tube V38 is by way of lead 54 and capacitor C110 from the junction between rectifier D21 and capacitor C132 associated with the gate G4. The triggering input for tube V39 is by way of capacitor C111 from the lead 56 which is connected to the terminal $t$, FIG. 4, of the connector panel CP. The triggering input for tube V40 is by way of capacitor C112 from the terminal $u$ of the connector panel CP while the triggering input for tube V41 is by way of capacitor C113 from the further terminal $s$ on the connector panel CP.

Associated with this group of tubes V38 . . . V41 is a further gas-filled trigger tube V22 whose cathode is also connected in parallel with those of the other four tubes and whose anode is likewise connected directly to the +300 v. supply. The triggering electrode of this further tube V22 is however normally isolated by the opened condition of contacts cc7. When such switch is closed, the one pulse per minute output from the basic time pulse generator TPG can be applied to the tube by way of capacitor C115. This causes the tube to provide a first or "code start" pulse at the beginning of every successive minute instead of the usual one in every six minutes. The form of operation is employed when a period of continuous transmission is required, as in fog or for ranging purposes.

Figure 2:
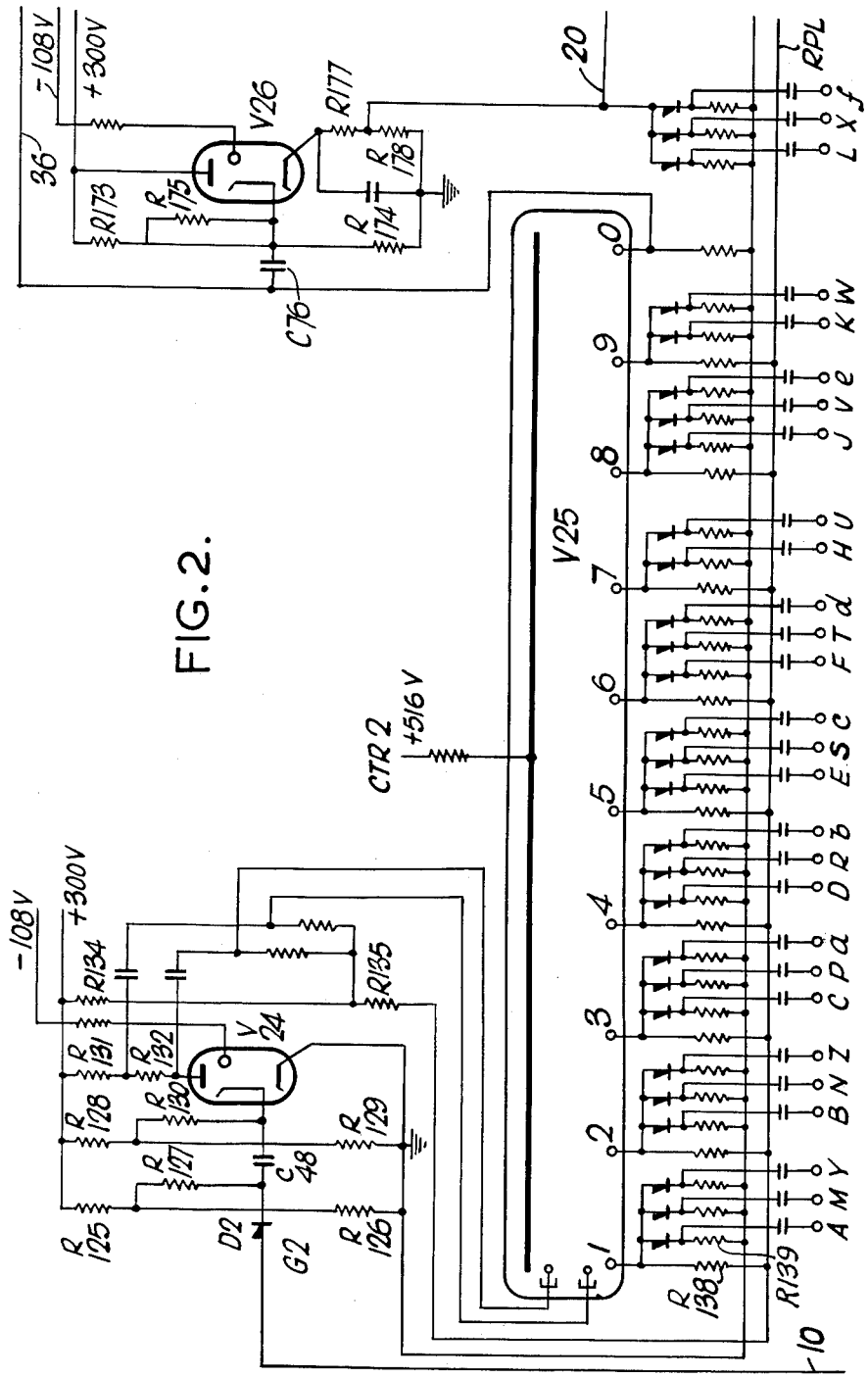

The gate G2 and the counter CTR2 are shown in FIG. 2 where the four-pulse per second output from tube V23, FIG. 4 is fed over lead 10 to rectifier D2. This rectifier is connected through capacitor C48 to the trigger electrode of a gas-filled trigger tube V24 arranged as a self-quenching pulse forming stage and provided with a split anode load of resistors R131 and R132. The junction between rectifier D2 and capacitor C48 is connected through resistor R127 to the junction of resistors R125 and R126 connected in series between the +300 v. supply and earth whereas the normal bias potential on lead 10 is zero. Such rectifier D2 is accordingly normally biased to the blocked condition but becomes opened when the bias potential on lead 10 is suitably raised by the conduction of either of the tubes V42 or V44 or the ring counter RTR, FIG. 4. When thus opened, the rectifier D2 allows the four pulse per second output on lead 10 to trigger the tube V24 whereby the latter provides, by an arrangement similar to that of tube V18, FIG. 6, appropriate time-displaced stepping potentials to the guide electrodes of the ten-cathode gas-filled counter tube V25.

Each of the cathodes of this tube is provided with an individual cathode load, such as the resistor R138 for cathode 1 and, in addition, each cathode is connected by way of separate blocking rectifiers and isolating capacitors, to a plurality of output terminals on the panel CP which present respectively the output voltages developed across separate load resistors such as that of R139 connected between cathode 1 and earth. Thus cathode 1 is connected to three separate terminals A, M and Y, cathode 2 is connected to terminals B, N and Z, cathode 3 is connected to terminals C, P and $a$, cathode 4 is connected to terminals D, R and $b$, cathode 5 is connected to terminals E, S and $c$, cathode 6 to terminals F, T and $d$, cathode 7 to terminals H and U, cathode 8 to terminals J, V and $e$ and cathode 9 to terminals K and W.

Three further outputs may be derived from cathode 0, i.e. the tenth cathode but this cathode also performs the further function of providing a triggering output to a subsequent counter tube and for this purpose such cathode 0 is connected by way of capacitor C76 to the trigger electrode of a gas-filled trigger tube V26 arranged as a self-quenching pulse forming stage and having a cathode load of series connected resistors R177 and R178 and from which an output is derived at the junction point between the resistors. This output is then supplied through blocking rectifiers and isolating capacitors, similar to those associated with the cathodes of tube V25, to further terminals L, X and f of the panel CP. In addition, such output is also fed over lead 20 to tube V28 of the counter CTR3, FIG. 3.

The circuits of the counter CTR3, associated gate circuits G5–G10 and the reset pulse generators RPG2 are shown in FIG. 3. A gas-filled trigger tube V28 is arranged as a self-quenching pulse forming stage provided with an anode load of series connected resistors R185 and R186 and having its trigger electrode connected by way of capacitor C81 and lead 20 to the cathode of tube V26, FIG. 2, which is associated with the tenth cathode of the counter tube V25. By means of RC networks of capacitor C82, resistor R191 and capacitor C83, capacitor R190, two time-displaced negative-going outputs are made available and applied to the first and second guide electrodes of a twelve cathode counter tube V29 to cause stepping of the discharge within such tube in the usual way.

The cathodes of tube V29 are coupled to form three groups, cathodes 1, 4, 7 and 10 being interconnected as one group, cathodes 2, 5, 8 and 11 being interconnected as a second group, cathodes 3, 6, 9 and 12 being interconnected as a third group. The first and second cathode groups are connected respectively through cathode load resistors R192 and R193 to the reset pulse line RPL whereas the third group is connected through load resistor R194 direct to earth.

The normal quiescent condition of the tube is when the discharge is resting on one of the cathodes 3, 6, 9 or 12 of the third group and the tube may be forced into this condition at any time by operation of the reset switch RS2 as already referred to in the previous description of tube V19.

The third group of cathodes is connected through rectifier D3 to a load-resistor and terminal j on the connector panel CP and also through further rectifier D5 and capacitor C84 to the mark rail ML. The same cathode group is connected also through rectifier D4 to a load resistor and terminal k on the connector panel CP and through rectifier D6 and capacitor C85 to the space rail SL. The first cathode group 1, 4, 7 and 10 is connected through rectifier D7 to a load resistor and the connector panel terminal m and through rectifier D9 and a capacitor to the mark rail ML and is further connected through rectifier D8 to a load resistor and connector panel terminal n and through rectifier D10 and a capacitor to the space rail SL. The second cathode group 2, 5, 8 and 11 is likewise connected through rectifier D11 to a load resistor and connector panel terminal p and through rectifier D13 and a capacitor to the mark rail ML and also by way of rectifier D12 to a load resistor and connector panel terminal r and through rectifier D14 and a capacitor to the space rail SL.

The first group of cathodes 1, 4, 7 and 10 is also connected through rectifier D16 to the junction between rectifiers D17 and capacitor C91 of the trigger electrode input of tube V27. The third group of cathodes of tube V29 is likewise connected through rectifier D15 to the same junction.

Tube V27 is a gas-filled trigger tube arranged as a self-quenching pulse forming stage and having its operative cathode connected directly to earth and its operative anode connected to the +300 v. supply by way of load resistor R213. This anode is coupled through capacitor C90 and lead 36 to the tenth cathode 0 of the counter tube V25, FIG. 2.

The aforesaid junction point between capacitor C91 and rectifier D17 is connected to earth through resistor R217 while the opposite side of rectifier D17 is likewise connected to earth through resistor R218 and is joined to connector panel terminal h.

In the operation of this circuit each input pulse derived from the tenth cathode of the counter tube V25, FIG. 2, causes tube V28 to fire and thereby to step the discharge in tube V29 around from one cathode to the next. In the quiescent condition, the discharge is resting upon one of the cathodes 3, 6, 9 or 12 of the tube and the resultant positive potential at such cathode is applied as a bias voltage to the rectifiers D3, D5 and D4, D6. If, for example, the connector panel terminal j is cross-connected to, say, connector panel terminal A associated with the counter tube V25 and if connector panel terminal k is cross-connected to the connector panel terminal B associated with the counter tube V25, then when the discharge of counter tube V25 rests on cathode 1 the resultant positive pulse fed to terminal j is passed through rectifier D5 and capacitor C84 to the mark rail ML and causes the relay C/2 to be energised. When, at the next unit time pulse, 0.25 second later, said discharge shifts from cathode 1 to cathode 2 of tube V25, the resultant positive pulse will be applied through rectifier D6 and capacitor C85 to the space rail SL to cause the relay C/2 to be de-energised, thereby transmitting a dot signal element.

If, instead, connector panel terminal D associated with tube V25 is connected to terminal k then the relay C/2 will not be de-energised until the arrival of the fourth unit pulse, thereby transmitting a dash signal element.

During the first cycle of tube V25 only rectifiers D3, D5 and D4, D6 will be biased conductive, the remainder being blocked. When, however, at the end of the first cycle of tube V25, cathode 0 of that tube is energised, the resultant triggering of tube V26 is extended to tube V28 thereby to shift the operative group in tube V29 to that of the first group of cathodes 1, 4, 7 and 10. This removes the previous unlocking bias of rectifiers D3, D5 and D4, D6 and places it on the rectifiers D7, D9 and D8, D10 whereby during the second cycle of tube V25 the particular cross-connection set up between the terminal group M–X and the further terminals m and n become effective to control the input to the mark and space rails ML and SL. At the end of the second cycle of tube V25 the further striking of tube V26 produces corresponding triggering of tube V28 and the resultant further stepping of the discharge in tube V29 to the second cathode group 2, 5, 8 and 11. This removes the previous unlocking bias on rectifiers D7, D9 and D8 and D10 and applies it instead to the rectifiers D11, D13 and D12, D14 whereby the cross-connection between terminals of the group Y, Z ... f associated with tube V25 to the terminals p and r become effective to control the pulse input to the mark and space rails ML and SL.

During the first and second ten-step cycles of tube V25 the resultant positive bias voltage on either the third or the first cathode groups in tube V29 is applied through either rectifier D16 or D15 to bias the rectifier D17 to a non-conductive state. During the third cycle of tube V25, the second cathode group of tube V29 is that in use and no such positive bias is applied to the rectifier D17. As a result of this any positive pulse to terminal h from its cross-connection to one of the group Y–f is effective to pass through rectifier D17 thereby triggering tube V27 which generates a high amplitude negative-going pulse at its anode. This pulse is then applied through capacitor C90 and lead 36 to the aforesaid cathode 0 of tube V25 which is thereby lowered to such an extent that it takes the discharge in such tube regardless of which cathode it may happen to be resting upon at that moment.

The circuit arrangements of the trigger circuit TRC are shown in FIG. 7, where tube V48 is a gas-filled trigger tube having the operating winding of relay C/2 in its cathode circuit and resistor F357 in its anode circuit. Relay C/2 is of the polarised type and its controlled contacts are arranged to key the radio transmitter "on" when the relay winding is energised and to key such transmitter "off" when such winding is de-energised.

The mark rail ML is connected to the trigger electrode of gas-filled trigger tube V46 which is arranged as a self-quenching pulse forming stage fired by each positive mark pulse on rail ML. This tube is provided with a cathode load of resistor R350 shunted by capacitor C134 whereby, upon firing of the tube, a high-amplitude positive-going output pulse is developed at the tube cathode and is applied by way of capacitor C135 and resistor R355 shunted by capacitor C136 to the trigger electrode of tube V48. This causes tube V48 to fire and relay C/2 to be operated.

The circuit of tube V48 is so arranged that, when the tube has been fired, it remains conductive until positively-extinguished by the application to the tube anode of a high-amplitude negative-going pulse by way of capacitor C137 and derived from the anode of a further gas-filled trigger tube V47.

This tube V47 has its trigger electrode connected to the space rail SL and is arranged in a self-quenching pulse forming circuit including anode resistor R364. Each positive-going space pulse fed to the space rail SL fires the tube to give a negative-going pulse at the tube anode for supply to the tube V48 to effect quenching of the latter.

It will be noted that the tube V48, having once been placed in a given condition, i.e., conducting by a "mark" pulse or non-conducting by a "space" pulse, is thereafter unaffected by any similar pulse and remains in the particular set condition until the arrival of a pulse of the opposite kind.

The circuit of the counter CTR4 and its associated reset circuit RPG1 is shown in FIG. 3 and comprises the gas-filled discharge tube V30 arranged as a self-quenching pulse forming stage and having its triggering electrode coupled through capacitor C92 to the third group of cathodes of the counter tube V29 and having also two series resistors R223 and R224 in its anode circuit for the derivation, in a manner similar to that already described in connection with the tube V18, of time-displaced potentials for application to the guide electrodes of a ten-cathode counter tube V31. Each time the counter tube V29 of counter CTR3 is stepped to its third cathode group, tube V30 is fired and the discharge in counter tube V31 is moved from one cathode to the next.

Cathode 10 of tube V31 is that upon which the discharge normally rests and this cathode is connected to the earth line by way of load resistor R236. Cathodes 1–6 of the counter tube are each connected to the reset pulse line RPL through individual cathode load resistors, such as that shown at R229 for cathode 1. Each of the cathodes 2, 3, 4, 5 and 6 are separately connected to the terminals v, w, x, y and z of the connection panel CP. The remaining cathodes 7, 8 and 9 are not used and are coupled to the reset pulse line RPL by way of common load resistor R235.

The tenth cathode of the tube V31 is coupled by way of capacitor C95 to the anode of a further gas-filled trigger tube V32 which is arranged as a self-quenching pulse forming stage having its triggering electrode connected to the terminal AA of the connector panel CP by way of capacitor C96.

The first arriving pulse at the trigger electrode of tube V30, which occurs when the counter tube CTR3 has completed its first three-step cycle, fired this tube and causes the discharge which normally rests on cathode 10 of tube V31 to shift to cathode 1. The completion of the next three-step cycle of tube V29 is marked by a further pulse to tube V30 and the consequential stepping of the discharge from cathode 1 to cathode 2 of the tube V31. This provides a positive output on terminal v. If only two code trannsmissions are required before the long bearing-obtaining signal, this terminal v is cross-connected to the connector panel terminal s associated with the pulse generator PG1, FIG. 5. If, however, two repetitions (i.e. a total of three transmissions of the code signal are required before the bearing signal, the terminal w is cross-connected to the terminal s so that the necessary positive output is not obtained until a further three-step cycle of the counter tube V29 has been completed.

The position marking the discharge in counter tube V31 at the end of the first group of identification signals, persists during the time of the long bearing signal so that when such code signal transmissions are resumed, the end of the next three-step cycle of counter tube V29 is marked by the further firing of tube V30 and the consequential shifting of the discharge in tube V31 from the previous cathode, for instance, cathode 3, to the next cathode such as cathode 4. Dependent upon the number of times the code signal is required to be transmitted after the bearing signal, one or other of the remaining terminals x, y and z are coupled to the connector panel terminal u associated with the pulse generator PG1 so that when the discharge finally rests at this chosen cathode, the necessary positive signal is transmitted to the pulse generator PG1 to step the four-stage ring counter RTR. This instant marks the end of the required transmission and by the accompanying connection of terminal AA to the same terminal x, y or z a positive pulse is provided for the trigger electrode of tube V32 which thereupon fires and transmits a high-amplitude negative pulse through capacitor C95 to cathode 10 of the tube V31. This draws the discharge directly to this cathode in readiness for the onset of the next cycle of operations.

The circuit arrangements of gate G3 and counter CTR5 are shown in FIG. 4. Lead 11 from the cathode of tube V23 is connected through capacitor C120 to one terminal of a rectifier D18 whose opposite terminal is coupled through capacitor C121 to the triggering electrode of a gas-filled trigger tube V33 arranged as a self-quenching pulse-forming stage and having two series-connected resistors R310 and R311 in its anode circuit. The junction between capacitor C120 and rectifier D18 is connected through resistor R303 to earth and also by way of lead 42 and a blocking rectifier to the cathode of tube V32 of the ring counter RTR. The junction between rectifier D18 and capacitor C121 is connected through resistor R306 to the junction between resistors R304 and R305 connected between earth and the +300 v. supply. The normal bias of the rectifier D18 is accordingly such that the positive-going unit time pulses, when available on lead 11, are not transmitted to the tube V33 until the tube V43 of the ring counter RTR is fired whereupon the resultant positive potential at the cathode of tube V43 unblocks the rectifier D18 and allows the unit pulses to be transmitted to the tube V33.

The tube V33 is arranged to provide two time-displaced negative-going outputs, in a manner similar to that of the tube V18, for application to the guide electrodes of a ten-cathode counter tube V34. The discharge in tube V34 normally rests on cathode 1 which is connected to earth through load resistor R317.

Cathode 2 of this tube V34 is connected to the reset pulse line RPL through resistor R319 and by way of rectifier D19 and capacitor C125 to the mark rail ML and also by way of capacitor C126 and lead 44 to the tube V35 of the following counter CTR6, FIG. 5.

When the gate G3 constituted by the rectifier D18 and its bias supplies is opened, the unit time pulses applied to tube V33 operate to step the discharge in tube V34 around its ring of ten cathodes. The first step from cathode 1 to cathode 2 is marked by the application of a positive pulse to the mark rail ML which serves to set the trigger circuit TRC "on" and so energise the relay C/2. At the same time a pulse is delivered to the next following counter CTR6. Each succeeding unit pulse continues to step the tube V34 and at each tenth pulse the discharge, on arriving at cathode 2, transmits a further positive pulse to the mark rail ML and the following counter CTR6. The latter operates the counter but the former is ineffective as the trigger circuit TRC remains set "on" and the relay C/2 continuously energised.

The normal home cathode 1 of the tube V34 is coupled through capacitor C124 to the lead 58 while the cathode 7 of the tube is likewise connected to lead 57 for reasons which will be explained hereafter in connection with the counter CTR6.

The circuit arrangement of the counter CTR6 and the reset pulse generator RPG3 are shown in FIG. 5 and comprise a gas-filled trigger tube V35 arranged as a self-quenching pulse-forming stage and feeding time-displaced output voltages to the guide electrodes of a twelve-cathode counter tube V36. The trigger electrode of tube V35 is coupled to the lead 44 from counter CTR5 and receives thereon positive pulses on the arrival of the first unit pulse at counter CTR5 and at every subsequent tenth pulse thereafter.

The discharge in tube V36 normally rests on cathode 12 and this cathode is connected to earth through resistor R332 and by way of capacitor C129 to the lead 58 also connected to cathode 1 of tube V34. Cathode 11 of tube V35 is connected through resistor R334 to the reset pulse line RPL and also by way of a blocking rectifier D20 and capacitor C130 to the space rail SL. This cathode is also connected through blocking rectifier D22 to the junction between capacitor C131 and rectifier D21. The opposite terminal of this rectifier D21 is connected through capacitor C132 to the trigger electrode of a gas-filled trigger tube V37. The anode output of this tube V37 across resistor R343 is connected for supply to lead 58.

The first arriving pulse from counter CTR5 shifts the discharge in tube V36 from cathode 12 to cathode 1 and so on to cathode 10 with the following nine further pulses. The eleventh arriving pulse from counter CTR5, which marks the completion of ten step cycles in such counter, shifts the discharge in tube V36 to the eleventh cathode with the resultant provision of a positive-going output signal to the space rail SL and to the junction between capacitor C131 and diode D21. The signal on rail SL operates to reset the trigger circuit TRC "off" and so causes the relay C/2 to become deenergised.

The gate G4, constituted by the diode D21 and the associated bias voltage supplies, is normally blocked by the positive bias potential through resistor R339 but is conditioned to open by the positive potential when available through rectifier D22 when the eleventh cathode of tube V36 is operative. Such gate then passes the positive pulse which will occur on lead 57 five unit pulses later when the discharge in tube V34 arrives at cathode 7. This pulse is then fed through rectifier D21 and fires the tube V37. The resultant high-amplitude negative pulse at the anode of this tube applied over lead 58 and through capacitor C129 to the cathode 12 of tube V36 and through capacitor C124 to cathode 1 of tube V34 serves to draw the discharge in each of such tubes back to the normal or home cathodes in readiness for the next operation.

Continuous transmission during fog or for ranging purposes is effected by energisation through suitable manually controlled switch means of an additional relay having eight contacts. The energising coil of this relay is not shown but the contacts cc1–cc6 of the relay, shown in FIG. 6, become closed to common all of the cathode output leads of tube V19 of the counter CTR1. This keeps the gate G1 permanently open by the provision of a continuous positive potential on lead 56. Contact cc7 of the same relay is in the circuit of the trigger electrode of tube V22, FIG. 5, and this becomes closed to give a continuous flow of one-minute pulses from lead CPB to the tube V22 and thereby to give a "code start" pulse at the beginning of each minute. This is necessary as it is no longer possible to obtain an output from tube V19 for the same purpose. The remaining contact (not shown) of the relay serves to lock the relay in.

Although the invention has been more particularly described in connection with an arrangement for controlling a radio transmitter, it will be clear that similar arrangements may be employed for many other purposes where a stepped or contoured cam would normally be employed. Such further applications of the arrangement will be obvious and it will be appreciated that, if desired, the choice of more than two alternatives, such as the "mark" and "stop" operations described, may be provided from the output of the counter CTR3 by the use of additional gate circuits. Furthermore, the form of control exercised can be of quite a different form. For example, the relay C/2 may be eliminated and direct electronic keying of the transmitter or other controlled device effected by the output or outputs available from the trigger circuit TRC. Alternatively, by substituting self-quenching pulse amplifiers for actuation by the pulses on the "mark" and "space" rails ML and SL respectively and by arranging for these to operate solenoids or other electro-mechanical devices, it is possible to obtain a step-by-step control in either of two opposite directions such as by causing such solenoids to operate ratchet and pawl mechanisms associated with a rotary shaft. Such a form of control may have useful application to automatic operations of machine tools and the like in accordance with a set programme determined by the cross-connections on an equivalent of the panel CP. In applications such as those last mentioned above, it will be apparent that the input pulses, as applied to gate G1, could be on a positional basis, i.e. related to the instantaneous position of the object or objects being operated upon by the machine tool. For example, the headstock spindle of a lathe could be arranged to control the emission of a series of pulses, say, one per revolution.

We claim:

1. Electronic control apparatus for effecting a cyclic repetition of a predetermined sequence of events at regular predetermined time intervals which comprises pulse generator means for providing a series of sequential input pulses having a constant predetermined time interval between successive pulses, interval counter means operated by said pulses for providing a series of active period defining signals of chosen constant time duration separated by quiescent periods of chosen constant time duration, input gate means controlled by said active period signals to be conductive during each of said active periods and non-conductive during said quiescent periods, a plurality of multi-electrode gas-discharge tubes of the counter type arranged so that the counting cycle of a first one of said tubes is controlled by said input pulses supplied through said input gate means and so that the counting cycle of the subsequent tube or tubes is controlled by the output or outputs from one or more of the sequentially active electrodes of the first or the preceding tube, and in which the outputs available from selected ones of the sequentially active electrodes of said first tube are employed in combination with the outputs available from selected ones of the sequentially active electrodes of said subsequent tube or tubes through the intermediary of coincidence gate circuits to actuate position-controlling means which perform the required sequence of operation steps only during said active periods.

2. Electronic control apparatus for effecting a cyclic repetition of a predetermined sequence of events at regular predetermined time intervals which comprises pulse generator means for providing a series of sequential input pulses having a constant predetermined time interval between successive pulses, interval counter means operated by said pulses for providing a series of active period defining signals of chosen constant time duration separated by quiescent periods of chosen constant time duration, input gate means controlled by said active period signals to be conductive during each of said active periods and non-conductive during said quiescent periods, at least a first and a second multi-electrode gas-discharge tube of the counter type, means for applying said input pulses to said first tube through said input gate means to cause said tube to execute during each of said active periods a plurality of counting cycles in which each of its output electrodes is energised in turn, means for deriving an output stepping pulse from said first tube once during each counting cycle thereof and for applying such stepping pulse to said second tube to cause at least some of its output electrodes to be energised in turn during successive counting cycles of said first tube, a plurality of coincidence gate circuit devices, a plurality of circuit connections each including buffer isolating means for connecting a first controlling input of each of said gate circuit devices to a chosen one of the output electrodes of said first tube, a second plurality of circuit connections for connecting a second controlling input of each of said gate circuit devices to a chosen one of the output electrodes of said second tube and electrically operated control means connected for operation by the outputs from said gate circuit devices.

3. Electronic control apparatus according to claim 1 in which said interval counter means include pulse counting means arranged to provide for the starting and stopping of each active period by a counting operation performed with said input pulses.

4. Electronic control apparatus according to claim 3 in which said input pulse train is derived through pulse frequency divider means from the output of a crystal controlled electronic oscillator.

5. Electronic control apparatus according to claim 1 in which the outputs from said gate circuit devices are combined into two groups for controlling two alternative control means.

6. Electronic control apparatus according to claim 5 in which said alternative control means are arranged respectively to produce a predetermined effect and to cancel such produced effect.

7. Electronic control apparatus according to claim 6 for controlling the keying of an electromagnetic wave transmitter in which a first control means is arranged to key said transmitter on and a second control means is arranged to key said transmitter off.

8. Electronic control apparatus according to claim 7 which includes a bistable state trigger circuit having an output serving to energise control means and in which the combined output from one group of said gate circuit devices is arranged as a triggering input to said trigger circuit and in which the combined output from the other group of said gate circuit devices is arranged as a resetting input to said trigger circuit.

9. Electronic control apparatus according to claim 7 which includes means for readily altering the cross-connections between said output electrodes of said counter type and said gate circuit devices.

10. Electronic control apparatus according to claim 9 in which said means comprises a multi-socket connector panel permanently connected to said gate circuit devices and to said tube electrodes and a plurality of differently cross-connected multi-pin connector plugs for selective insertion in the sockets of said connector panel.

11. Electronic control apparatus according to claim 10 which includes reset means operative upon some or all of said counter tubes to force the operative discharge therein to a predetermined output electrode regardless of the particular output electrode which is active at the instant of operation of said reset means.

12. Electronic control apparatus according to claim 11 in which a control potential for operating said reset means effective upon the first one of said counter tubes is derived from an output electrode of a further counter tube whose counting cycle is controlled from an output derived from said first counter tube.

13. Electronic control apparatus according to claim 12 in which the connection of said reset means to a chosen output electrode of said further counter tube is made through said multi-socket connector panel.

14. Electronic control apparatus according to claim 1 which comprises a second plurality of multi-electrode gas-discharge tubes of the counter type arranged so that the counting cycle of the first one of said tubes is controlled also by said input pulse train and so that the counting cycle or cycles of the subsequent tube or tubes is controlled by the output or outputs from electrodes of the first or preceding tubes, selected outputs from electrodes of said second plurality of tubes being also employed to actuate said position control means instead of those of said first plurality of tubes.

References Cited in the file of this patent

UNITED STATES PATENTS

| | | |
|---|---|---|
| 2,523,244 | Woodward | Sept. 19, 1950 |
| 2,813,199 | Sciaky et al. | Nov. 12, 1957 |
| 2,926,242 | Feyzeau | Feb. 23, 1960 |
| 2,945,183 | Harthe et al. | July 12, 1960 |

OTHER REFERENCES

Brierley: An Industrial Batching Counter, Electronic Engineering (April 1954), vol. XXVI, No. 314, pages 157 to 160.